(12) United States Patent
Zhang et al.

(10) Patent No.: US 11,094,110 B2
(45) Date of Patent: Aug. 17, 2021

(54) METHOD, APPARATUS AND ELECTRONIC DEVICE FOR PROCESSING IMAGE

(71) Applicant: Beijing Dajia Internet Information Technology Co., Ltd., Beijing (CN)

(72) Inventors: Lei Zhang, Beijing (CN); Wen Zheng, Beijing (CN); Wenbo Zhang, Beijing (CN); Qiang Li, Beijing (CN); Hongmin Xu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/972,475

(22) PCT Filed: Jul. 26, 2019

(86) PCT No.: PCT/CN2019/098011
§ 371 (c)(1),
(2) Date: Dec. 4, 2020

(87) PCT Pub. No.: WO2020/063084
PCT Pub. Date: Apr. 2, 2020

(65) Prior Publication Data
US 2021/0166469 A1   Jun. 3, 2021

(30) Foreign Application Priority Data
Sep. 28, 2018  (CN) .......................... 201811142166.1

(51) Int. Cl.
*G06K 9/00* (2006.01)
*G06T 15/20* (2011.01)
(Continued)

(52) U.S. Cl.
CPC ............. *G06T 15/205* (2013.01); *G06N 3/04* (2013.01); *G06T 7/90* (2017.01)

(58) Field of Classification Search
CPC ....... H04N 19/00024; H04N 19/00139; H04N 19/00315; H04N 19/00448;
(Continued)

(56) References Cited

U.S. PATENT DOCUMENTS 7,289,127 B1   10/2007  Zimmer et al.
8,019,182 B1 *  9/2011  Wolfram ............ H04N 1/40068
                                                         382/299
(Continued)

FOREIGN PATENT DOCUMENTS

CN      102737369      10/2012
CN      102737391      10/2012
(Continued)

OTHER PUBLICATIONS

Ze et al., "Cross Fusion between Color and Gray for Color Images Morphing Technology," College of Computer Science and Technology University of Science and Technology of China, Dec. 2012, 5 pages.
(Continued)

*Primary Examiner* — Duy M Dang
(74) *Attorney, Agent, or Firm* — Hanley, Flight & Zimmerman, LLC (57) ABSTRACT

The application shows a method, an apparatus, and an electronic device for processing an image. The method includes: obtaining an image of a first rendering style; obtaining an image of a second rendering style according to the image of the first rendering style and a first preset processing model; generating at least one first intermediate gradient image according to the image of the first rendering style, the image of the second rendering style, and a second preset processing model, the at least one first intermediate gradient image comprising an image in a process of gradient from the image of the first rendering style to the image of the (Continued)

second rendering style; generating a first gradient video according to the image of the first rendering style, at least one first intermediate gradient image, and an image of the second rendering style.

19 Claims, 3 Drawing Sheets

(51) Int. Cl.
  *G06T 7/90* (2017.01)
  *G06N 3/04* (2006.01)
(58) Field of Classification Search
  CPC ........... H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 1/46; H04N 1/54; H04N 1/56; H04N 1/60; H04N 1/6025; G06T 15/205; G06T 7/90; G06T 2207/20081; G06T 2207/20084; G06T 2207/10024; G06N 3/02; G06N 3/04
  USPC ........................................................ 382/162
  See application file for complete search history.

(56) References Cited

U.S. PATENT DOCUMENTS

2012/0250997 A1\* 10/2012 Kumazaki .......... H04N 1/00167
  382/167
2019/0220746 A1\* 7/2019 Liu .......................... G06N 3/08

FOREIGN PATENT DOCUMENTS

| CN | 104217452 | 12/2014 |
|----|-----------|---------|
| CN | 107624243 | 1/2018 |
| CN | 109360261 | 2/2019 |

OTHER PUBLICATIONS

International Searching Authority, "Search Report," issued in connection with International Patent Application No. PCT/CN2019/098011, dated Oct. 9, 2019, 4 pages.
China National Intellectual Property Office, "Office Action," issued in connection with Chinese Patent Application No. 201811142166.1, dated Apr. 23, 2019, 13 pages.
China National Intellectual Property Office, "Office Action," issued in connection with Chinese Patent Application No. 201811142166.1, dated Jul. 8, 2019, 6 pages.
International Searching Authority, "Written Opinion," Issued in connection with International Patent Application No. PCT/CN2019/096011, dated Sep. 27, 2019, 9 pages (English Translation Included).

\* cited by examiner

METHOD, APPARATUS AND ELECTRONIC DEVICE FOR PROCESSING IMAGE

CROSS-REFERENCE TO RELATED APPLICATIONS

This application is a US National phase of International Application No. PCT/CN2019/098011, filed on Jul. 26, 2019, which is based on and claims priority under 35 U.S.C 119 to Chinese Patent Application No. 201811142166.1, filed with the China National Intellectual Property Administration on Sep. 28, 2018 and entitled "METHOD, APPARATUS, ELECTRONIC DEVICE, AND STORAGE MEDIUM FOR PROCESSING IMAGE", which is incorporated herein by reference in its entirety.

FIELD

This application relates to the field of computer technologies, in particular to a method, an apparatus, and an electronic device for processing an image.

BACKGROUND

With the development of technologies, watching videos has become people's main entertainment manner. To improve experience of watching videos, more and more users like to watch gradient videos shot through time-lapse photography, for example, a gradient video from day to night, or a gradient video from dawn to morning.

However, in a related technology, if a user wants to acquire a gradient video, the user requires to speed a long time in continuously shooting a video of a location by using a camera, leading to low efficiency of acquiring a gradient video.

SUMMARY

According to a first aspect of this application, a method for processing an image is provided, where the method includes:
  acquiring an image with a first rendering style;
  acquiring an image with a second rendering style based on the image with the first rendering style and a first preset processing model;
  generating at least one first intermediate gradient image based on the image with the first rendering style, the image with the second rendering style, and a second preset processing model; where the at least one first intermediate gradient image includes an image in a gradient process from the image with the first rendering style to the image with the second rendering style; and generating a first gradient video based on the image with the first rendering style, the at least one first intermediate gradient image, and the image with the second rendering style.

According to a second aspect of this application, an apparatus for processing an image is provided, where the apparatus includes:
  a first acquiring module, configured to acquire an image with a first rendering style;
  a second acquiring module, configured to acquire an image with a second rendering style based on the image with the first rendering style and a first preset processing model;
  a first generating module, configured to generate at least one first intermediate gradient image based on the image with the first rendering style, the image with the second rendering style, and a second preset processing model; where the at least one first intermediate gradient image includes an image in a gradient process from the image with the first rendering style to the image with the second rendering style; and a second generating module, configured to generate a first gradient video based on the image with the first rendering style, the at least one first intermediate gradient image, and the image with the second rendering style.

According to a third aspect of this application, an electronic device is provided, where the electronic device includes:
  a processor; and a memory configured to store an executable instruction of the processor; where the processor is configured to perform the following operations:
  acquiring an image with a first rendering style;
  acquiring an image with a second rendering style based on the image with the first rendering style and a first preset processing model;
  generating at least one first intermediate gradient image based on the image with the first rendering style, the image with the second rendering style, and a second preset processing model; where the at least one first intermediate gradient image includes an image in a gradient process from the image with the first rendering style to the image with the second rendering style; and generating a first gradient video based on the image with the first rendering style, the at least one first intermediate gradient image, and the image with the second rendering style.

According to a fourth aspect of this application, a non-temporary computer readable storage medium is provided, where when an instruction in the storage medium is executed by a processor of an electronic device, the electronic device is enabled to perform the method for processing the image described in the first aspect.

According to a fifth aspect of this application, a computer program product is provided, where when an instruction in the computer program product is executed by a processor of an electronic device, the electronic device is enabled to perform the method for processing the image described in the first aspect.

It should be understood that the foregoing general descriptions and the following detailed descriptions are merely used as an example and used for explanation, and cannot limit this application.

BRIEF DESCRIPTION OF THE DRAWINGS

The accompanying drawings herein are incorporated into this specification and form one part of this specification, show embodiments conforming to this application, and are used, together with this specification, to explain the principle of this application.

DETAILED DESCRIPTION OF THE EMBODIMENTS

The example embodiments are described in detail herein, and the examples are represented in the accompanying drawings. When the accompanying drawings are described below, unless otherwise specified, same numbers in different accompanying drawings represent same or similar elements. Implementations described in the following example embodiments are not all implementations consistent with this application. On the contrary, the implementations are merely examples of apparatuses and methods described in detail in the claims and consistent with some aspects of this application.

Figure 1:
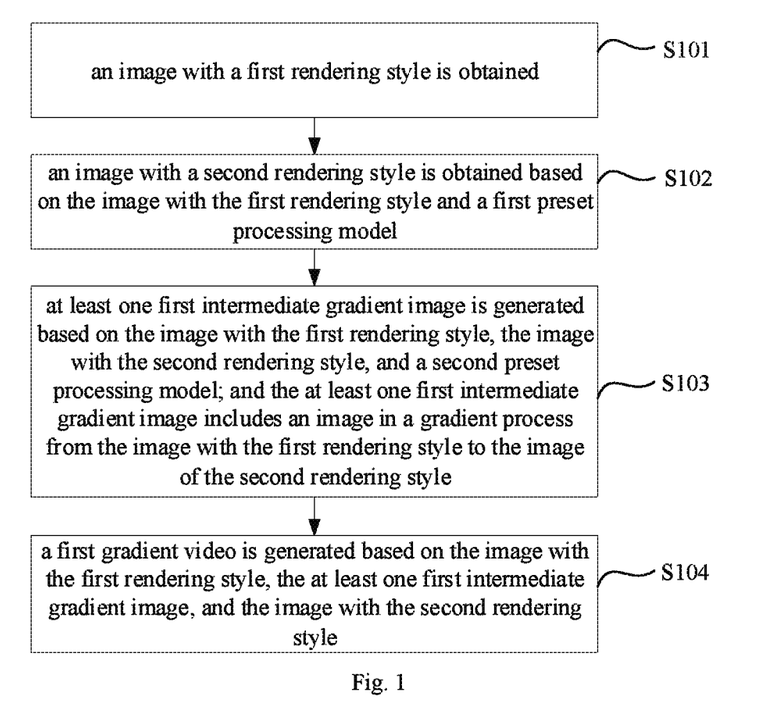
FIG. 1 illustrates a flowchart of a method for processing an image according to this application.

FIG. 1 illustrates a flowchart of a method for processing an image according to this application. As shown in FIG. 1, the method is applied to an electronic device, and the method includes the following steps.

In S101, an image with a first rendering style is acquired.

In this application, when a user is interested in scenery in a location, the user may want to watch a gradient video including the scenery and similar to time-lapse photography, for example, a gradient video of the scenery from day to night or a gradient video of the scenery from dawn to morning. In this case, the user does not require to continuously shoot a several-hour gradient video of the scenery by using a camera, but may take one image including the scenery by using an electronic device, namely, the image with the first rendering style.

Each image has its own rendering style, for example, a green rendering style, a blue rendering style, or a red rendering style. The user may use a filter when capturing the image including the scenery by using the electronic device, so that the captured image is an image with a rendering style. Alternatively, the user does not use a filter when capturing the image including the scenery by using the electronic device. In this case, the captured image is close to reality, and a style of the captured image is a no-rendering style. In this application, the no-rendering style is a special rendering style.

In some embodiments, in addition to that the image with the first rendering style may be taken on site by using the electronic device, the image with the first rendering style may be further acquired from a pre-stored image library, or the image with the first rendering style may be downloaded from a network or may be acquired in another manner. A specific manner of acquiring the image with the first rendering style is not limited in this application.

In S102, an image with a second rendering style is acquired based on the image with the first rendering style and a first preset processing model.

In this application, image content of the image with the second rendering style may be the same as image content of the image with the first rendering style.

This step may be implemented in the following three manners. One manner includes the following.

11). Receiving the specified second rendering style.

In this application, the gradient video that the user requires to acquire is a gradient video in which images gradually change from the first rendering style to another rendering style. Therefore, after acquiring the first rendering style, the electronic device also requires to acquire another rendering style, to acquire the gradient video in which the images gradually change from the first rendering style to another rendering style.

The user may specify the second rendering style in the electronic device. For example, after capturing the image with the first rendering style by using the electronic device, the user may input a request for acquiring a gradient video in the electronic device. After receiving the request, the electronic device may display a preset plurality of rendering styles on a screen of the electronic device for the user to select. After viewing the plurality of rendering styles on the screen of the electronic device, the user may select one rendering style, and the electronic device receives the rendering style selected by the user, and uses the rendering style as the second rendering style.

12). Determining a relationship table of color transformation for transforming the first rendering style into the second rendering style.

In this application, different rendering styles correspond to different pieces of color information, and transforming an image with a rendering style into an image with another rendering style is essentially transforming colors of pixels in the image with a rendering style into colors corresponding to another rendering style. Therefore, to acquire the image with the second rendering style based on the image with the first rendering style, the relationship table of color transformation for transforming the first rendering style into the second rendering style requires to be determined.

In this application, a plurality of rendering styles are preset, for example, a green rendering style, a blue rendering style, or a red rendering style. Therefore, for any two rendering styles, a relationship table of color transformation for transforming one rendering style into the other rendering style of the two rendering styles requires to be preset; and then, the one rendering style, the other rendering style, and the specified relationship table of color transformation form corresponding entries and are stored in a correspondence among an original rendering style, a target rendering style, and a relationship table of color transformation by using the one rendering style as an original rendering style and the other rendering style as a target rendering style. In addition, a relationship table of color transformation for transforming the other rendering style into the one rendering style of the two rendering styles requires to be preset; and then, the other rendering style, the one rendering style, and the specified relationship table of color transformation form corresponding entries and are stored in the correspondence among an original rendering style, a target rendering style, and a relationship table of color transformation by using the other rendering style as an original rendering style and the one rendering style as a target rendering style. The foregoing operations are performed for every two other preset rendering styles.

In this way, in this step, the relationship table of color transformation corresponding to the first rendering style and the second rendering style may be searched for in the correspondence among an original rendering style, a target rendering style, and a relationship table of color transformation by using the first rendering style as an original rendering style and the second rendering style as a target rendering style.

13). Acquiring first color information of each pixel in the image with the first rendering style.

Color information of a pixel may be identified by using values of the pixel in a red channel, a green channel, and a blue channel, or may be identified in another manner. This is not limited in this application.

14). Searching for second color information corresponding to the first color information of each pixel in the relationship table of color transformation.

The relationship table of color transformation includes two columns. A first column stores each piece of first color information corresponding to the first rendering style, a second column stores each piece of second color information corresponding to the second rendering style, and each row stores one piece of first color information corresponding to the first rendering style and one piece of second color information corresponding to the second rendering style.

For any pixel, first color information of the pixel may be searched for in the first column of the relationship table of color transformation; and then, second color information corresponding to the first color information of the pixel is searched for in the second column, that is, the second color information in a same row as the first color information of the pixel is searched for. The foregoing operations are performed for each of the other pixels.

15). Generating the image with the second rendering style based on the second color information corresponding to the first color information of each pixel.

Pixels in the image with the first rendering style have respective locations in the image with the first rendering style. After the second color information corresponding to the first color information of each pixel is acquired, a blank image of same resolution as the image with the first rendering style may be generated, locations of the pixels in the blank image are determined based on the locations of the pixels in the image with the first rendering style, and the respective locations of the pixels in the blank image are filled with the second color information corresponding to the first color information of the pixels, to acquire the image with the second rendering style.

Another manner includes the following.

21). Receiving the specified second rendering style.

In this application, the gradient video that the user requires to acquire is a gradient video in which images gradually change from the first rendering style to another rendering style. Therefore, after acquiring the first rendering style, the electronic device also requires to acquire the another rendering style, to acquire the gradient video in which the images gradually change from the first rendering style to the another rendering style.

The user may specify the second rendering style in the electronic device. For example, after capturing the image with the first rendering style by using the electronic device, the user may input a request for acquiring a gradient video in the electronic device. After receiving the request, the electronic device may display a preset plurality of rendering styles on a screen of the electronic device for the user to select. After viewing the plurality of rendering styles on the screen of the electronic device, the user may select one rendering style, and the electronic device receives the rendering style selected by the user, and uses the rendering style as the second rendering style.

22). Determining a neural network model for acquiring the image with the second rendering style, namely, the above first preset processing model.

In this application, different rendering styles correspond to different pieces of color information, and transforming an image with a rendering style into an image with another rendering style is essentially transforming colors of pixels in the image with a rendering style into colors corresponding to another rendering style.

Therefore, to acquire the image with the second rendering style based on the image with the first rendering style, the neural network model for acquiring the image with the second rendering style requires to be determined. The neural network model is used to process an input image, and output an image with the specified rendering style.

In this application, a plurality of rendering styles are preset, for example, a green rendering style, a blue rendering style, or a red rendering style.

Therefore, for any rendering style, a neural network model for acquiring an image with the rendering style requires to be pre-trained. For example, a preset neural network may be trained by using an annotation image with the rendering style until all parameters in the preset neural network converge, to acquire the neural network model for acquiring the image with the rendering style. Then, the rendering style and the trained neural network model for acquiring the image with the rendering style form corresponding entries, and are stored in a correspondence between a rendering style and a neural network model for acquiring an image with the rendering style. The foregoing operations are performed for each of the other rendering styles.

In this way, in this step, the neural network model corresponding to the second rendering style may be searched for in the correspondence between a rendering style and a neural network model for acquiring an image with the rendering style.

23). Processing the image with the first rendering style by using the neural network model, to acquire the image with the second rendering style.

For example, the image with the first rendering style is input to the acquired neural network model, to acquire the image with the second rendering style output by the acquired neural network model.

Still another manner includes the following.

31). Acquiring a preset image with the second rendering style.

In this application, the gradient video that the user requires to acquire is a gradient video in which images gradually change from the first rendering style to another rendering style. Therefore, after acquiring the first rendering style, the electronic device also requires to acquire another rendering style, to acquire the gradient video in which the images gradually change from the first rendering style to the another rendering style.

For example, after capturing the image with the first rendering style by using the electronic device, the user may input a request for acquiring a gradient video in the electronic device. After receiving the request, the electronic device may display a preset plurality of rendering styles on a screen of the electronic device for the user to select. After viewing the plurality of rendering styles on the screen of the electronic device, the user may select one rendering style, and the electronic device receives the rendering style selected by the user, uses the rendering style as the second rendering style, and then selects the preset image with the second rendering style in preset images with the preset plurality of rendering styles.

32). Generating a reference image.

An image may be randomly generated as the reference image, for example, a plain white image or an all black image is generated.

33). Performing at least one round of optimal iteration on the reference image by using an iterative optimization algorithm, based on the image with the first rendering style and the preset image with the second rendering style; and determining a reference image on which the optimal iteration has been performed as the image with the second rendering style, when a difference between a rendering style of the reference image and the second rendering style is less than a first preset threshold and a difference between image content of the reference image and image content of the image with the first rendering style is less than a second preset threshold.

A first image feature of the image with the first rendering style, a second image feature of the image with the second rendering style, and a third image feature of the reference image may be acquired.

A difference between the first image feature and the third image feature is acquired and is used as a first difference between the image content of the reference image and the image content of the image with the first rendering style. A difference between the second image feature and the third image feature is acquired and is used as a second difference between the rendering style of the reference image and the second rendering style. Color information of pixels in the reference image is adjusted based on the first difference and the second difference and according to a preset rule, to acquire the reference image on which the optimal iteration has been performed.

Then, a fourth image feature of the reference image on which the optimal iteration has been performed is acquired. A difference between the first image feature and the fourth image feature is acquired and is used as a third difference between the image content of the reference image on which the optimal iteration has been performed and the image content of the image with the first rendering style. A difference between the second image feature and the fourth image feature is acquired and is used as a fourth difference between the rendering style of the reference image on which the optimal iteration has been performed and the second rendering style. If the fourth difference is less than the first preset threshold and the third difference is less than the second preset threshold, the reference image on which the optimal iteration has been performed is determined as the image with the second rendering style; otherwise, optimal iteration continues to be performed on the reference image on which the optimal iteration has been performed based on the above steps; and a reference image on which the optimal iteration has been performed is determined as the image with the second rendering style when a difference between a rendering style of the reference image and the second rendering style is less than the first preset threshold, and a difference between image content of the reference image and the image content of the image with the first rendering style is less than the second preset threshold.

In S103, at least one first intermediate gradient image is generated based on the image with the first rendering style, the image with the second rendering style, and a second preset processing model; and the at least one first intermediate gradient image includes an image in a gradient process from the image with the first rendering style to the image of the second rendering style.

In this application, this step may be implemented by using the following process, including:

41). For each same location in the image with the first rendering style and the image with the second rendering style, acquiring first color information of a pixel in the location in the image with the first rendering style and second color information of a pixel in the location in the image with the second rendering style; and determining at least one piece of target color information of a pixel in the location based on the first color information, the second color information, a preset first rendering style coefficient, and a preset second rendering style coefficient.

In this application, resolution of the image with the first rendering style is the same as resolution of the image with the second rendering style. Therefore, for a location of any pixel in the image with the first rendering style, there is a pixel in the location in the image with the second rendering style.

For any same location in the image with the first rendering style and the image with the second rendering style, the first color information of the pixel in the location in the image with the first rendering style and the second color information of the pixel in the location in the image with the second rendering style may be acquired, and then the at least one piece of target color information of the pixel in the location may be determined based on the first color information, the second color information, the preset first rendering style coefficient, and the preset second rendering style coefficient. The foregoing operations are performed for each of the other same locations in the image with the first rendering style and the image with the second rendering style.

When the at least one piece of target color information of the pixel in the location is determined based on the first color information, the second color information, the preset first rendering style coefficient, and the preset second rendering style coefficient, a first product of the first color information and the preset first rendering style coefficient may be calculated, then a second product of the second color information and the preset second rendering style coefficient may be calculated, and then a first sum of the first product and the second product may be calculated. Then, a second sum of the first color information and the second color information is calculated. Then, a ratio of the first sum to the second sum is calculated and is used as the target color information.

Color information of a pixel may be identified by using values of the pixel in a red channel, a green channel, and a blue channel. Certainly, color information of a pixel may be identified in another manner. This is not limited in this application.

42). Generating at least one candidate image based on the at least one piece of target color information of a pixel in each location.

In this step, a blank image of which resolution is the same as that of the image with the first rendering style or a blank image of which resolution is the same as that of the image with the second rendering style may be generated, then a location of each pixel in the blank image is determined based on a location of the each pixel in the image with the first rendering style or a location of the each pixel in the image with the second rendering style, and then, the location of each pixel in the blank image is filled with the target color information of the each pixel, to acquire the candidate image.

43). Determining the at least one first intermediate gradient image based on the at least one candidate image.

In some embodiments, the at least one candidate image may be directly determined as at least one intermediate gradient image.

In some embodiments, to improve realness of the gradient process from the image with the first rendering style to the image with the second rendering style, generally, local processing requires to be performed on the intermediate gradient image. For example, usually, lights in a building do not require to be turned on during daytime, but require to be turned on at night.

When an image is transformed into images with different rendering styles, generally, local processing is performed on intermediate gradient images in transformation processes in different manners. For example, in a gradient process from day to night, lights in a building require to be turned on gradually, and the number of lights that are turned on is gradually increased. In a gradient process from dawn to morning, the lights in the building require to be turned off gradually, and the number of lights that are turned on is gradually decreased. Therefore, local processing requires to be performed on the intermediate gradient image, to improve realness of the gradient process. In this case, a processing manner is to identify a window of the building and change color information of the window, to reflect on or off of the lights in the building.

For another example, when a blue rendering style is transformed into a red rendering style or a purple rendering style, generally, color information of pixels is transformed, and there is no need to perform local processing on an image.

Therefore, whether to perform local processing and how to perform local processing are usually determined based on an original rendering style and a target rendering style.

Therefore, a local processing manner requires to be acquired based on the first rendering style and the second rendering style, and then the at least one candidate image is processed according to the acquired local processing manner, to acquire the at least one intermediate gradient image.

For any two rendering styles, in a process of transforming an image with one of the two rendering styles into an image with the other rendering style, a local processing manner of performing local processing on an intermediate gradient image in the process requires to be preset, and then, the one rendering style, the other rendering style, and the specified local processing manner form corresponding entries and are stored in a correspondence among an original rendering style, a target rendering style, and a local processing manner by using the one rendering style as an original rendering style and the other rendering style as a target rendering style. In addition, in a process of transforming the image with the other of the two rendering styles into the image with the one rendering style, a local processing manner of performing local processing on an intermediate gradient image in the process requires to be preset, and then, the other rendering style, the one rendering style, and the specified local processing manner form corresponding entries and are stored in the correspondence among an original rendering style, a target rendering style, and a local processing manner by using the other rendering style as an original rendering style and the one rendering style as a target rendering style. The foregoing operations are performed for every two other preset rendering styles.

In this way, when the local processing manner is acquired based on the first rendering style and the second rendering style, the local processing manner corresponding to the first rendering style and the second rendering style may be searched for in the correspondence among an original rendering style, a target rendering style, and a local processing manner by using the first rendering style as an original rendering style and the second rendering style as a target rendering style.

In some embodiments, to highlight a gradient effect in the gradient process from the image with the first rendering style to the image with the second rendering style, usually, there are at least two first intermediate gradient images in the gradient process from the image with the first rendering style to the image with the second rendering style, and an actual quantity may be specifically determined based on a rendering style difference between the image with the first rendering style and the image with the second rendering style. Details are not described in this application.

The preset first rendering style coefficient includes a difference between a preset value and the preset second rendering style coefficient. The preset value may be 1 or the like. In this way, the preset second rendering style coefficient may be constantly increased at a particular increase amplitude, the preset first rendering style coefficient is decreased each time the preset second rendering style coefficient is increased, and 41) to 43) are performed again after the preset second rendering style coefficient is increased until the preset second rendering style coefficient is the same as the preset value.

According to the method, at least two intermediate gradient images may be acquired, and for a sequence of acquiring the intermediate gradient images, a rendering style of an intermediate gradient image that is acquired earlier is closer to the first rendering style, and a rendering style of an intermediate gradient image that is acquired later is closer to the second rendering style.

In S104, a first gradient video is generated based on the image with the first rendering style, the at least one first intermediate gradient image, and the image with the second rendering style.

In this application, the image with the first rendering style may be used as an image in a first frame, the image with the second rendering style may be used as an image in a last frame, and the at least one first intermediate gradient image may be used as an image between the image with the first rendering style and the image with the second rendering style, to form the first gradient video.

If there are at least two first intermediate gradient images, a sequence of the at least two first intermediate gradient images in the first gradient video is the same as a sequence of acquiring the first intermediate gradient images.

In this application, the image with the first rendering style is acquired; the image with the second rendering style is acquired based on the image with the first rendering style and the first preset processing model; the at least one first intermediate gradient image is generated based on the image with the first rendering style, the image with the second rendering style, and the second preset processing model, where the at least one first intermediate gradient image includes the image in the gradient process from the image with the first rendering style to the image with the second rendering style; and the first gradient video is generated based on the image with the first rendering style, the at least one first intermediate gradient image, and the image with the second rendering style. According to this application, when a user requires to acquire a gradient video, the user does not require to spend a long time in continuously shooting the gradient video by using a camera, and can acquire the gradient video in the manner in this application only by capturing one image, thereby improving efficiency of acquiring a gradient video and improving user experience.

Further, sometimes, the user may require to acquire a plurality of continuous gradient effects to further have better gradient experience, for example, a gradient process from the first rendering style to the second rendering style and then from the second rendering style to a third rendering style.

Therefore, to bring better gradient experience to the user, in some embodiments, an image with the third rendering style may be acquired based on the image with the second rendering style and the first preset processing model, where image content of the image with the third rendering style may be the same as the image content of the image with the second rendering style. Then, at least one second intermediate gradient image is generated based on the image with the second rendering style, the image with the third rendering style, and the second preset processing model, where the at least one second intermediate gradient image includes an image in a gradient process from the image with the second rendering style to the image with the third rendering style. Then, a second gradient video is generated based on the image with the second rendering style, the at least one second intermediate gradient image, and the image with the third rendering style. Then, the first gradient video and the second gradient video are combined into a third gradient video. In this way, when the user watches the third gradient video, the user can experience the gradient process from the first rendering style to the second rendering style and the gradient process from the second rendering style to the third rendering style, so as to have better gradient experience, and further improve user experience. For specific implementations of the steps in the embodiments of this application, refer to the foregoing embodiments. Details are not described herein again.

Figure 2:
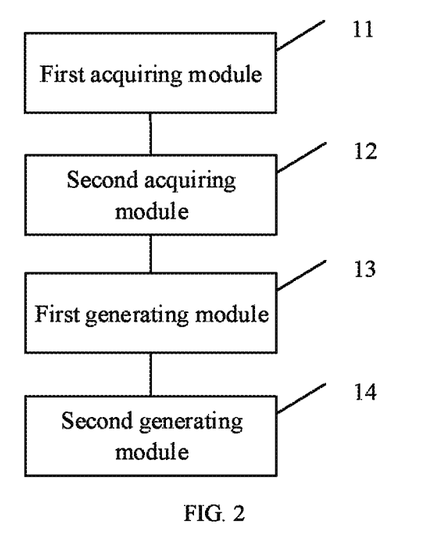
FIG. 2 illustrates a block diagram of an apparatus for processing an image according to this application.

FIG. 2 illustrates a block diagram of an apparatus for processing an image according to this application. Referring to FIG. 2, the apparatus includes: a first acquiring module 11, configured to acquire an image with a first rendering style; a second acquiring module 12, configured to acquire an image with a second rendering style based on the image with the first rendering style and a first preset processing model; a first generating module 13, configured to generate at least one first intermediate gradient image based on the image with the first rendering style, the image with the second rendering style, and a second preset processing model; where the at least one first intermediate gradient image includes an image in a gradient process from the image with the first rendering style to the image with the second rendering style; and a second generating module 14, configured to generate a first gradient video based on the image with the first rendering style, the at least one first intermediate gradient image, and the image with the second rendering style.

In some embodiments, the second acquiring module 12 includes: a first acquiring unit, configured to acquire first color information of each pixel in the image with the first rendering style; a searching unit, configured to search for second color information corresponding to the first color information of each pixel in a relationship table of color transformation for transforming the first rendering style into the second rendering style; and a first generating unit, configured to generate the image with the second rendering style based on the second color information corresponding to the first color information of each pixel.

In some embodiments, the first determining unit is specifically configured to: search for the relationship table of color transformation corresponding to the first rendering style and the second rendering style in a correspondence among an original rendering style, a target rendering style, and a relationship table of color transformation with the first rendering style as the original rendering style and the second rendering style as the target rendering style.

In some embodiments, the first preset processing model is a neural network model for acquiring the image with the second rendering style; and the second acquiring module 12 includes: a processing unit, configured to acquire the image with the second rendering style by processing the image with the first rendering style by using the neural network model.

In some embodiments, the second determining unit is specifically configured to: search for the neural network model corresponding to the second rendering style in a correspondence between a rendering style and a neural network model for acquiring an image with the rendering style.

In some embodiments, the second acquiring module 12 includes: a second acquiring unit, configured to acquire a preset image with the second rendering style; a second generating unit, configured to generate a reference image; and an iteration unit, configured to perform at least one round of optimal iteration on the reference image by using an iterative optimization algorithm, based on the image with the first rendering style and the preset image with the second rendering style; and determine a reference image on which the optimal iteration has been performed as the image with the second rendering style, when a difference between a rendering style of the reference image and the second rendering style is less than a first preset threshold and a difference between image content of the reference image and image content of the image with the first rendering style is less than a second preset threshold.

In some embodiments, the first generating module 13 includes: a third acquiring unit, configured to acquire first color information of a pixel in the location in the image with the first rendering style and second color information of a pixel in the location in the image with the second rendering style, for each same location in the image with the first rendering style and the image with the second rendering style; a third determining unit, configured to determine at least one piece of target color information of a pixel in the location based on the first color information, the second color information, a preset first rendering style coefficient, and a preset second rendering style coefficient; a third generating unit, configured to generate at least one candidate image based on the at least one piece of target color information of a pixel in each location; and a fourth determining unit, configured to determine the at least one first intermediate gradient image based on the at least one candidate image.

In some embodiments, the fourth determining unit includes: a determining subunit, configured to determine the at least one candidate image as the at least one first intermediate gradient image; or an acquiring subunit, configured to acquire a local processing manner based on the first rendering style and the second rendering style, and a processing subunit, configured to acquire the at least one first intermediate gradient image by processing the at least one candidate image according to the local processing manner.

In some embodiments, the acquiring subunit is specifically configured to search for the local processing manner corresponding to the first rendering style and the second rendering style in a correspondence among an original rendering style, a target rendering style, and a local processing manner, with the first rendering style as the original rendering style and the second rendering style as the target rendering style.

In some embodiments, the apparatus further includes: a fourth acquiring module, configured to acquire an image with a third rendering style based on the image with the second rendering style and the first preset processing model; a fourth generating module, configured to generate at least one second intermediate gradient image based on the image with the second rendering style, the image with the third rendering style, and the second preset processing model, where the at least one second intermediate gradient image includes an image in a gradient process from the image with the second rendering style to the image with the third rendering style; a fifth generating module, configured to generate a second gradient video based on the image with the second rendering style, the at least one second intermediate gradient image, and the image with the third rendering style; and a combination module, configured to combine the first gradient video and the second gradient video into a third gradient video.

In this application, the image with the first rendering style is acquired; the image with the second rendering style is acquired based on the image with the first rendering style and the first preset processing model; the at least one first intermediate gradient image is generated based on the image with the first rendering style, the image with the second rendering style, and the second preset processing model; where the at least one first intermediate gradient image includes the image in the gradient process from the image with the first rendering style to the image with the second rendering style; and the first gradient video is generated based on the image with the first rendering style, the at least one first intermediate gradient image, and the image with the second rendering style. According to this application, when a user requires to acquire a gradient video, the user does not require to spend a long time in continuously shooting the gradient video by using a camera, and can acquire the gradient video in the manner in this application only by capturing one image, thereby improving efficiency of acquiring a gradient video and improving user experience.

For the apparatus in the foregoing embodiments, specific manners of performing operations by the modules have been described in detail in the embodiments related to the method, and details are not described herein again.

Figure 3:
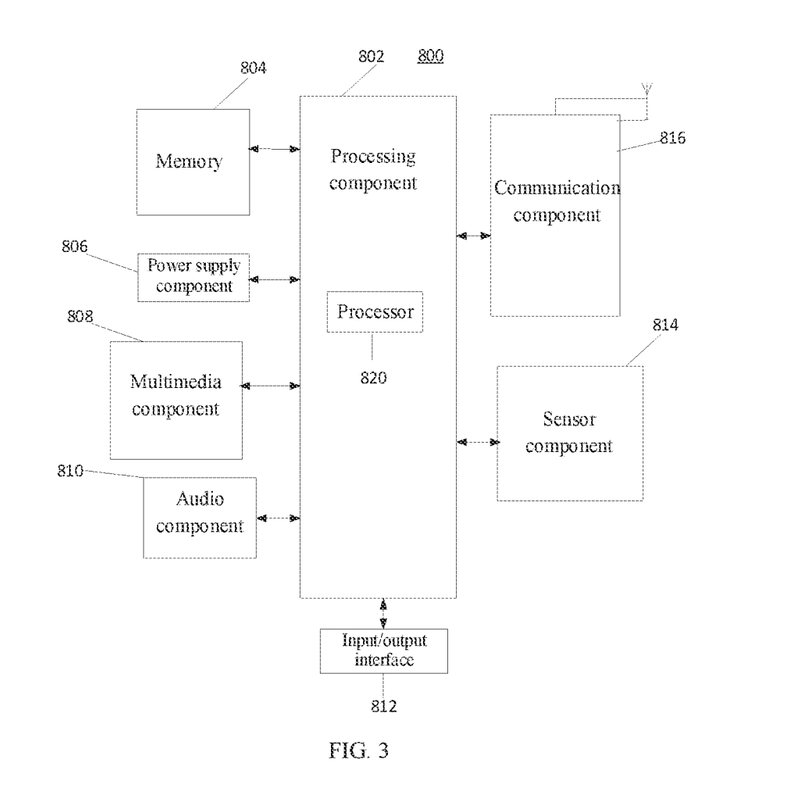
FIG. 3 illustrates a block diagram of an electronic device according to this application.

FIG. 3 illustrates a block diagram of an electronic device 800 according to this application. For example, the electronic device 800 may be a mobile phone, a computer, a digital broadcasting terminal, a message transceiver device, a game console, a tablet device, a medical device, fitness equipment, a personal digital assistant, or the like.

Referring to FIG. 3, the electronic device 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls an overall operation of the electronic device 800, for example, operations associated with displaying, calling, data communication, camera operations, and recording operations. The processing component 802 may include one or more processors 820, to execute an instruction, to complete all or some steps of the method. In addition, the processing component 802 may include one or more modules, facilitating interaction between the processing component 802 and the other components. For example, the processing component 802 may include a multimedia module, facilitating interaction between the multimedia component 808 and the processing component 802.

The memory 804 is configured to store various types of data, to support operations of the device 800. An example of the data includes an instruction of any application or method operated in the electronic device 800, contact data, address book data, a message, an image, a video, and the like. The memory 804 may be implemented by any type of volatile or non-volatile storage devices or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 806 supplies power to various components of the electronic device 800. The power supply component 806 may include a power supply management system, one or more power supplies, and other components associated with generating electricity for, managing electricity for, and supplying electricity to the electronic device 800.

The multimedia component 808 includes a screen providing an output interface between the electronic device 800 and a user. In some embodiments, the screen may include a liquid crystal display (LCD) and a touch panel (TP). If the screen includes the touch panel, the screen may be implemented as a touch screen, to receive an input signal from the user. The touch panel includes one or more touch sensors, to sense touching, sliding, and a gesture on the touch panel. The touch sensor not only may sense a boundary of a touch or sliding operation, but also may detect duration and pressure related to the touch or sliding operation. In some embodiments, the multimedia component 808 includes a front-facing camera and/or rear-facing camera. When the device 800 is an operation mode, such as a photographing mode or a video mode, the front-facing camera and/or the rear-facing camera may receive external multimedia data. Each of the front-facing camera and the rear-facing camera may be a fixed optical lens system or have a focal length and an optical zooming capability.

The audio component 810 is configured to output and/or input an audio signal. For example, the audio component 810 includes a microphone (MIC). When the electronic device 800 is in an operation mode, such as a calling mode, a recording mode, and a speech recognition mode, the microphone is configured to receive the external audio signal. The received audio signal may be further stored in the memory 804 or sent by using the communication component 816. In some embodiments, the audio component 810 further includes a loudspeaker, configured to output the audio signal.

The I/O interface 812 provides an interface between the processing component 802 and a peripheral interface module, and the peripheral interface module may be a keyboard, a click wheel, buttons, or the like. The buttons include, but not limited to, a home page button, a volume button, a start button, and a lock button.

The sensor component 814 includes one or more sensors, and is configured to provide status estimation in various aspects for the electronic device 800. For example, the sensor component 814 may detect an on/off state of the device 800 and relative positioning of a component. For example, the component is a display and a keypad of the electronic device 800. The sensor component 814 may further detect a location change of the electronic device 800 or a component of the electronic device 800, detect whether there is contact between the user and the electronic device 800, and detect an orientation or acceleration/slowing down of the electronic device 800 and a temperature change of the electronic device 800. The sensor component 814 may include a proximity sensor, configured to detect existence of a nearby object when there is no physical contact. The sensor component 814 may further include an optical sensor, such as a CMOS or CCD image sensor, used in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the electronic device 800 and other devices. The electronic device 800 may access a wireless network based on a communication standard, such as Wi-Fi, an operator network (such as 2G, 3G, 4G, or 5G), or a combination thereof. In some embodiments, the communication component 816 receives, through a broadcast channel, a broadcast signal or broadcast-related information from an external broadcasting management system. In some embodiments, the communication component 816 further includes a near field communication (NFC) module, to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the electronic device 800 may be implemented by using one or more application-specific integrated circuits (ASIC), one or more digital signal processors (DSP), one or more digital signal processing devices (DSPD), one or more programmable logic devices (PLD), one or more field programmable gate arrays (FPGA), one or more controllers, one or more microcontrollers, one or more microprocessors, or one or more other electronic elements, to perform the foregoing method.

In some embodiments, a non-temporary computer readable storage medium including an instruction is further provided, such as the memory 804 including the instruction. The instruction may be executed by the processor 802 of the electronic device 800 to complete the foregoing method. For example, the non-temporary computer readable storage medium may be an ROM, a random access memory (RAM), a CD-ROM, a magnetic tape, a floppy disk, or an optical data storage device.

In some embodiments, a computer program product is further provided. The computer program product may be stored in the memory 804, and when an instruction in the computer program product is executed by the processor 820 of the electronic device 800, the electronic device 800 is enabled to perform the image processing method.

Figure 4:
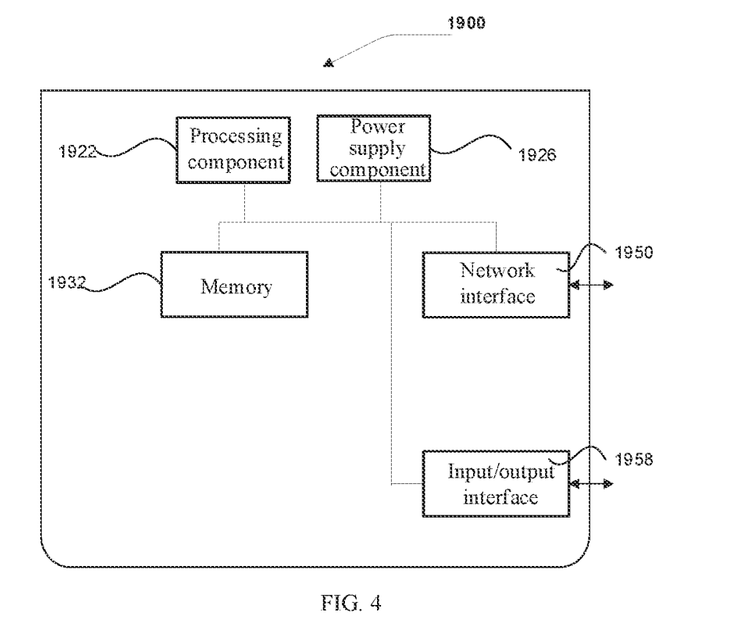
FIG. 4 illustrates a block diagram of an electronic device according to this application.

FIG. 4 illustrates a block diagram of an electronic device 1900 according to this application. For example, the electronic device 1900 may be provided as a server.

Referring to FIG. 4, the electronic device 1900 includes a processing component 1922, and further includes one or more processors, and a memory resource represented by a memory 1932, configured to store an instruction that can be executed by the processing component 1922, such as an application. The application stored in the memory 1932 may include one or more modules, where each module corresponds to one group of instructions. In addition, the processing component 1922 is configured to execute the instruction, to perform the foregoing method.

The electronic device 1900 may further include a power supply component 1926, configured to execute power supply management for the electronic device 1900; a wired or wireless network interface 1950, configured to connect the electronic device 1900 to a network; and an input/output (I/O) interface 1958. The electronic device 1900 may be operated based on an operating system stored in the memory 1932, such as Windows Server™, Mac OS X™, Un

What is claimed is:

1. A method for processing an image, comprising:
acquiring an image with a first rendering style;
acquiring an image with a second rendering style based on the image with the first rendering style and a first processing model;
generating at least one first intermediate gradient image based on the image with the first rendering style, the image with the second rendering style, and a second processing model;
wherein the at least one first intermediate gradient image comprises an image in a gradient process from the image with the first rendering style to the image with the second rendering style; and
generating a first gradient video based on the image with the first rendering style, the at least one first intermediate gradient image, and the image with the second rendering style;
wherein the first processing model is a relationship table of color transformation for transforming the first rendering style into the second rendering style; and
said acquiring the image with the second rendering style comprises:
acquiring first color information of each pixel in the image with the first rendering style;
searching for second color information corresponding to the first color information of each pixel in the relationship table of color transformation for transforming the first rendering style into the second rendering style; and
generating the image with the second rendering style based on the second color information corresponding to the first color information of each pixel.

2. The method according to claim 1, wherein determining the relationship table of color transformation comprises:
searching for the relationship table of color transformation corresponding to the first rendering style and the second rendering style in a correspondence among an original rendering style, a target rendering style, and a relationship table of color transformation, with the first rendering style as the original rendering style and the second rendering style as the target rendering style.

3. The method according to claim 1, wherein the first processing model is a neural network model for acquiring the image with the second rendering style; and
said acquiring the image with the second rendering style comprises:
acquiring the image with the second rendering style by processing the image with the first rendering style through the neural network model.

4. The method according to claim 3, wherein said determining the neural network model comprises:
searching for the neural network model corresponding to the second rendering style in a correspondence between a rendering style and a neural network model for acquiring an image with the rendering style.

5. The method according to claim 1, wherein said acquiring the image with the second rendering style comprises:
acquiring an image with the second rendering style;
generating a reference image;
performing at least one round of optimal iteration on the reference image through an iterative optimization algorithm, based on the image with the first rendering style and the image with the second rendering style; and
determining a reference image on which the optimal iteration has been performed as the image with the second rendering style, when a difference between a rendering style of the reference image and the second rendering style is less than a first threshold and a difference between image content of the reference image and image content of the image with the first rendering style is less than a second threshold.

6. The method according to claim 1, wherein the second processing model comprises a first rendering style coefficient and a second rendering style coefficient; and
said generating the at least one first intermediate gradient image comprises:
for each same location in the image with the first rendering style and the image with the second rendering style, acquiring first color information of a pixel in the location in the image with the first rendering style and second color information of a pixel in the location in the image with the second rendering style, and determining at least one piece of target color information of a pixel in the location based on the first color information, the second color information, the first rendering style coefficient, and the second rendering style coefficient;

generating at least one candidate image based on the at least one piece of target color information of a pixel in each location; and determining the at least one first intermediate gradient image based on the at least one candidate image.

7. The method according to claim 6, wherein said determining the at least one first intermediate gradient image comprises:

determining the at least one candidate image as the at least one first intermediate gradient image;

or, determining the at least one first intermediate gradient image by acquiring a local processing manner based on the first rendering style and the second rendering style and processing the at least one candidate image based on the local processing manner.

8. The method according to claim 7, wherein said acquiring the local processing manner comprises:

searching for the local processing manner corresponding to the first rendering style and the second rendering style in a correspondence among an original rendering style, a target rendering style, and a local processing manner, with the first rendering style as the original rendering style and the second rendering style as the target rendering style.

9. The method according to claim 1, wherein the method further comprises:

acquiring an image with a third rendering style based on the image with the second rendering style and the first processing model;

generating at least one second intermediate gradient image based on the image with the second rendering style, the image with the third rendering style, and the second processing model; wherein the at least one second intermediate gradient image comprises an image in a gradient process from the image with the second rendering style to the image with the third rendering style;

generating a second gradient video based on the image with the second rendering style, the at least one second intermediate gradient image, and the image with the third rendering style; and generating a third gradient video by combining the first gradient video and the second gradient video.

10. An electronic device, comprising:

a processor; and a memory configured to store an executable instruction of the processor; wherein the processor is configured to perform following operations:

acquiring an image with a first rendering style;

acquiring an image with a second rendering style based on the image with the first rendering style and a first processing model;

generating at least one first intermediate gradient image based on the image with the first rendering style, the image with the second rendering style, and a second processing model; wherein the at least one first intermediate gradient image comprises an image in a gradient process from the image with the first rendering style to the image with the second rendering style; and generating a first gradient video based on the image with the first rendering style, the at least one first intermediate gradient image, and the image with the second rendering style;

wherein the first processing model is a relationship table of color transformation for transforming the first rendering style into the second rendering style; and the processor is configured to:

acquire first color information of each pixel in the image with the first rendering style;

search for second color information corresponding to the first color information of each pixel in the relationship table of color transformation for transforming the first rendering style into the second rendering style; and generate the image with the second rendering style based on the second color information corresponding to the first color information of each pixel.

11. The electronic device according to claim 10, wherein the processor is configured to:

search for the relationship table of color transformation corresponding to the first rendering style and the second rendering style in a correspondence among an original rendering style, a target rendering style, and a relationship table of color transformation, with the first rendering style as the original rendering style and the second rendering style as the target rendering style.

12. The electronic device according to claim 10, wherein the first processing model is a neural network model for acquiring the image with the second rendering style; and the processor is configured to:

acquire the image with the second rendering style by processing the image with the first rendering style through the neural network model.

13. The electronic device according to claim 12, wherein the processor is configured to:

search for the neural network model corresponding to the second rendering style in a correspondence between a rendering style and a neural network model for acquiring an image with the rendering style.

14. The electronic device according to claim 10, wherein the processor is configured to:

acquire an image with the second rendering style;

generate a reference image;

perform at least one round of optimal iteration on the reference image through an iterative optimization algorithm, based on the image with the first rendering style and the image with the second rendering style; and determine a reference image on which the optimal iteration has been performed as the image with the second rendering style, when a difference between a rendering style of the reference image and the second rendering style is less than a first threshold and a difference between image content of the reference image and image content of the image with the first rendering style is less than a second threshold.

15. The electronic device according to claim 10, wherein the second processing model comprises a first rendering style coefficient and a second rendering style coefficient; and the processor is configured to:

for each same location in the image with the first rendering style and the image with the second rendering style, acquire first color information of a pixel in the location in the image with the first rendering style and second color information of a pixel in the location in the image with the second rendering style, and determine at least one piece of target color information of a pixel in the location based on the first color information, the second color information, the first rendering style coefficient, and the second rendering style coefficient;

generate at least one candidate image based on the at least one piece of target color information of a pixel in each location; and determine the at least one first intermediate gradient image based on the at least one candidate image.

16. The electronic device according to claim 15, wherein the processor is configured to:

determine the at least one candidate image as the at least one first intermediate gradient image;

or, determine the at least one first intermediate gradient image by acquiring a local processing manner based on the first rendering style and the second rendering style and processing the at least one candidate image based on the local processing manner.

17. The electronic device according to claim 16, wherein the processor is configured to:

search for the local processing manner corresponding to the first rendering style and the second rendering style in a correspondence among an original rendering style, a target rendering style, and a local processing manner, with the first rendering style as the original rendering style and the second rendering style as the target rendering style.

18. The electronic device according to claim 10, wherein the processor is further configured to:

acquire an image with a third rendering style based on the image with the second rendering style and the first processing model;

generate at least one second intermediate gradient image based on the image with the second rendering style, the image with the third rendering style, and the second processing model; wherein the at least one second intermediate gradient image comprises an image in a gradient process from the image with the second rendering style to the image with the third rendering style;

generate a second gradient video based on the image with the second rendering style, the at least one second intermediate gradient image, and the image with the third rendering style; and generate a third gradient video by combining the first gradient video and the second gradient video.

19. A non-temporary computer readable storage medium, wherein when an instruction in the storage medium is executed by a processor of an electronic device, the electronic device is enabled to:

acquire an image with a first rendering style;

acquire an image with a second rendering style based on the image with the first rendering style and a first processing model;

generate at least one first intermediate gradient image based on the image with the first rendering style, the image with the second rendering style, and a second processing model;

wherein the at least one first intermediate gradient image comprises an image in a gradient process from the image with the first rendering style to the image with the second rendering style; and generate a first gradient video based on the image with the first rendering style, the at least one first intermediate gradient image, and the image with the second rendering style;

wherein the first processing model is a relationship table of color transformation for transforming the first rendering style into the second rendering style; and the electronic device is configured to:

acquire first color information of each pixel in the image with the first rendering style;

search for second color information corresponding to the first color information of each pixel in the relationship table of color transformation for transforming the first rendering style into the second rendering style; and generate the image with the second rendering style based on the second color information corresponding to the first color information of each pixel.

* * * * *